United States Patent
Sung et al.

(10) Patent No.: US 10,880,575 B2
(45) Date of Patent: Dec. 29, 2020

(54) METHOD AND APPARATUS FOR DECODING VIDEO SIGNAL

(71) Applicant: LG Electronics Inc., Seoul (KR)

(72) Inventors: Jae Won Sung, Seoul (KR); Seung Wook Park, Seoul (KR); Yong Joon Jeon, Seoul (KR); Jung Sun Kim, Seoul (KR); Young Hee Choi, Seoul (KR); Byeong Moon Jeon, Seoul (KR); Joon Young Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/780,336

(22) Filed: Feb. 3, 2020

(65) Prior Publication Data

US 2020/0177915 A1 Jun. 4, 2020

Related U.S. Application Data

(63) Continuation of application No. 16/210,700, filed on Dec. 5, 2018, now Pat. No. 10,555,003, which is a
(Continued)

(30) Foreign Application Priority Data

May 7, 2009 (KR) .......................... 10-2009-0039683

(51) Int. Cl.
*H04N 19/593* (2014.01)
*H04N 19/105* (2014.01)
(Continued)

(52) U.S. Cl.
CPC ......... *H04N 19/593* (2014.11); *H04N 19/105* (2014.11); *H04N 19/14* (2014.11);
(Continued)

(58) Field of Classification Search
CPC .................................................... H04N 19/593
(Continued)

(56) References Cited

U.S. PATENT DOCUMENTS

| | | |
|---|---|---|
| 5,812,197 A | 9/1998 | Chan et al. |
| 2004/0062445 A1* | 4/2004 | Kim ....................... H04N 19/14 |
| | | 382/238 |

(Continued)

FOREIGN PATENT DOCUMENTS

| | | |
|---|---|---|
| JP | 2004/304724 | 10/2004 |
| KR | 10-2007-0037532 | 4/2007 |

(Continued)

OTHER PUBLICATIONS

"Series H: Audiovisual and Multimedia Systems Infrastructure of Audiovisual Services—Coding of Moving Video; Advanced Video Coding for Generic Audiovisual Services" ITU-T Recommendation H.264 (May 2003), ITU-T Standard Superseded(S), International Telecommunication Union, Geneva, CH, No. H.264 (May 2003), May 30, 2003, 282 pages.

(Continued)

*Primary Examiner* — Yulin Sun
(74) *Attorney, Agent, or Firm* — Fish & Richardson P.C.

(57) ABSTRACT

A method and apparatus for decoding a video signal are disclosed. A method for decoding a video signal includes obtaining block type information of a current block, confirming a prediction mode of the current block based on the block type information, obtaining, if the prediction mode of the current block is an intra prediction mode according to the prediction mode, at least one correlation parameter information using at least one neighboring pixel of the current block, obtaining an intra prediction value of the current (Continued)

block using the correlation parameter information, and reconstructing the current block using the intra prediction value of the current block.

13 Claims, 8 Drawing Sheets

Related U.S. Application Data continuation of application No. 15/441,591, filed on Feb. 24, 2017, now Pat. No. 10,306,263, which is a continuation of application No. 15/007,896, filed on Jan. 27, 2016, now Pat. No. 9,756,358, which is a continuation of application No. 12/991,210, filed as application No. PCT/KR2009/002403 on May 7, 2009, now Pat. No. 9,277,244.

(60) Provisional application No. 61/102,012, filed on Oct. 2, 2008, provisional application No. 61/051,343, filed on May 7, 2008.

(51) Int. Cl.
| | |
|---|---|
| *H04N 19/176* | (2014.01) |
| *H04N 19/61* | (2014.01) |
| *H04N 19/14* | (2014.01) |
| *H04N 19/157* | (2014.01) |
| *H04N 19/182* | (2014.01) |
| *H04N 19/44* | (2014.01) |
| *H04N 19/86* | (2014.01) |
| *H04N 19/46* | (2014.01) |

(52) U.S. Cl.
CPC ......... *H04N 19/157* (2014.11); *H04N 19/176* (2014.11); *H04N 19/182* (2014.11); *H04N 19/44* (2014.11); *H04N 19/46* (2014.11); *H04N 19/61* (2014.11); *H04N 19/86* (2014.11)

(58) Field of Classification Search
USPC .................................................. 375/240.12
See application file for complete search history.

(56) References Cited

U.S. PATENT DOCUMENTS

| | | |
|---|---|---|
| 2004/0136458 A1 | 7/2004 | Dahlhoff et al. |
| 2004/0156436 A1 | 8/2004 | Seo |
| 2006/0251330 A1* | 11/2006 | Toth ........................ G06N 3/084 |
| | | 382/236 |
| 2007/0133891 A1 | 6/2007 | Jeong |
| 2008/0219576 A1 | 9/2008 | Jung et al. |
| 2009/0110069 A1 | 4/2009 | Jung et al. |
| 2009/0238276 A1 | 9/2009 | Har-Noy et al. |
| 2009/0310677 A1* | 12/2009 | Shiodera ............... H04N 19/147 |
| | | 375/240.15 |
| 2019/0110074 A1 | 4/2019 | Sung et al. |

FOREIGN PATENT DOCUMENTS

| | | |
|---|---|---|
| WO | 2003/049452 | 6/2003 |
| WO | 2008/012918 | 1/2008 |
| WO | 2008/048489 | 4/2008 |

OTHER PUBLICATIONS

European Office Action dated Aug. 20, 2013 for Application No. 09742849, 7 pages.
European Search Report dated Jul. 1, 2011 for Application No. 09742849, 9 pages.
F. Pan, et al. "A Directional Field Based Fast Intra Mode Decision Algorithm for H.264 Video Coding", 2004 IEEE International Conference On Multimedia And Expo (ICME): Jun. 27-30, 2004, Taipei, Taiwan, Piscataway, NJ: IEEE Operations Center, US, vol. 2, Jun. 27, 2004, pp. 1147-1150,XP010771027.
International search Report dated Dec. 23, 2009 for Application No. PCT/KR2009/002403, full English translation, 4 pages.
Matsou S. et al.; "Weighted Infra Prediction", 33. VCEG Meeting; 82. MPEG Meeting; Oct. 20, 2007-Oct. 20, 2007; Shenzhen; (Video Coding Experts Group OfITU-T SG.16) . . . No. VCEG-AG18, Oct. 20, 2007 (Oct. 20, 2007), XP0300003622. ISSN:0000-0095.

* cited by examiner

| PredictionMode | Name of PredictionMode |
|---|---|
| 0 | Vertical |
| 1 | Horizontal |
| 2 | DC |
| 3 | Diagonal down left |
| 4 | Diagonal down right |
| 5 | Vertical right |
| 6 | Horizontal down |
| 7 | Vertical left |
| 8 | Horizontal up |

FIG. 5A

| M | A | B | C | D |
|---|---|---|---|---|
| I | (0,0)<br>= A + a | (1,0)<br>= B + a | (2,0)<br>= C + a | (3,0)<br>= D + a |
| J | (0,1)<br>= A + 2a | (1,1)<br>= B + 2a | (2,1)<br>= C + 2a | (3,1)<br>= D + 2a |
| K | (0,2)<br>= A + 3a | (1,2)<br>= B + 3a | (2,2)<br>= C + 3a | (3,2)<br>= D + 3a |
| L | (0,3)<br>= A + 4a | (1,3)<br>= B + 4a | (2,3)<br>= C + 4a | (3,3)<br>= D + 4a |

4x4 current block

FIG. 5B

| M | A | B | C | D |
|---|---|---|---|---|
| I | (0,0)<br>= A+a+b | (1,0)<br>= B+a+b | (2,0)<br>= C+a+b | (3,0)<br>= D+a+b |
| J | (0,1)<br>= A+4a+2b | (1,1)<br>= B+4a+2b | (2,1)<br>= C+4a+2b | (3,1)<br>= D+4a+2b |
| K | (0,2)<br>= A+9a+3b | (1,2)<br>= B+9a+3b | (2,2)<br>= C+9a+3b | (3,2)<br>= D+9a+3b |
| L | (0,3)<br>= A+16a+4b | (1,3)<br>= B+16a+4b | (2,3)<br>= C+16a+4b | (3,3)<br>= D+16a+4b |

4x4 current block

METHOD AND APPARATUS FOR DECODING VIDEO SIGNAL

CROSS-REFERENCE TO RELATED APPLICATIONS

This application is a continuation of U.S. patent application Ser. No. 16/210,700, filed Dec. 5, 2018, now allowed, which is a continuation of U.S. patent application Ser. No. 15/441,591, filed Feb. 24, 2017, now U.S. Pat. No. 10,306, 263, which is a continuation of U.S. patent application Ser. No. 15/007,896, filed Jan. 27, 2016, now U.S. Pat. No. 9,756,358, which is a continuation of U.S. patent application Ser. No. 12/991,210, filed Dec. 21, 2010, now U.S. Pat. No. 9,277,244, which is a National Phase of International Patent Application No. PCT/KR2009/002403, filed May 7, 2009, which claims the benefit of U.S. Provisional Patent Application Nos. 61/051,343 and 61/102,012 filed on May 7, 2008 and Oct. 2, 2008, respectively, which claims the benefit of Korean Patent Application No. 10-2009-0039683 filed on May 7, 2009, all of which are incorporated by reference as if fully set forth herein.

BACKGROUND OF THE INVENTION

Field of the Invention

The present invention relates to a method and apparatus for decoding a video signal.

Discussion of the Related Art

Generally, compression coding indicates a series of signal processing technologies which can transmit digitized information through a communication line or can store the digitized information in a specific form suitable for a storage medium. A variety of objects can be compression-coded, for example, sound data, image (or video) data, text data, etc. Particularly, technology for compression encoding image data is called image compression technology. Video data is characterized in that it has spatial redundancy and temporal redundancy.

Likewise, if the spatial redundancy and the temporal redundancy are not fully removed, a compression rate is reduced while a video signal is coded. In addition, if the spatial redundancy and the temporal redundancy are excessively removed, it is impossible to generate information required for decoding the video signal, resulting in deterioration of a recovery rate.

SUMMARY OF THE INVENTION

Accordingly, the present invention is directed to a method and apparatus for decoding a video signal that substantially obviates one or more problems due to limitations and disadvantages of the related art.

An object of the present invention is to provide a method and apparatus for decoding a video signal so as to increase coding efficiency of the video signal.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for decoding a video signal includes obtaining block type information of a current block, confirming a prediction mode of the current block based on the block type information, obtaining, if the prediction mode of the current block is an intra prediction mode according to the confirmed prediction mode, at least one correlation parameter information using a reference pixel, obtaining an intra prediction value of the current block using the correlation parameter information, and reconstructing the current block using the intra prediction value of the current block.

The reference pixel may include at least one pixel which is adjacent to a left side, an upper side, a left upper side, and a right upper side of the current block.

The reference pixel may be a filtering-processed pixel when the prediction mode of the current block is an intra 8×8 prediction mode.

The correlation parameter information may be obtained using a difference between pixels adjacent to the current block.

If the prediction mode of the current block is a vertical prediction mode, the correlation parameter information may be obtained using a pixel value adjacent to a left side of the current block.

An intra prediction value of a current pixel in the current block may be obtained using vertical coordinates of the current pixel, the correlation parameter information, and a pixel value adjacent to an upper side of the current block.

If the prediction mode of the current block is a horizontal prediction mode, the correlation parameter information may be obtained using a pixel value adjacent to an upper side of the current block.

An intra prediction value of a current pixel in the current block may be obtained using horizontal coordinates of the current pixel, the correlation parameter information, and a pixel value adjacent to a left side of the current block.

If the prediction mode of the current block is a prediction mode other than vertical and horizontal prediction modes, the correlation parameter information may include vertical correlation parameter information, that is obtained using a pixel value adjacent to a left side of the current block, and horizontal correlation parameter information, that is obtained using a pixel value adjacent to an upper side of the current block.

In another aspect of the present invention, an apparatus for decoding a video signal includes a prediction mode confirming unit confirming a prediction mode of a current block based on block type information of the current block, a correlation parameter information obtaining unit obtaining, if the prediction mode of the current block is an intra prediction mode according to the confirmed prediction mode, at least one correlation parameter information using a reference pixel, and a prediction value obtaining unit obtaining an intra prediction value of the current block using the correlation parameter information.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 5A to 8 show various examples for obtaining a predicted pixel value under an intra 4×4 vertical prediction mode according to the present invention.

DESCRIPTION OF SPECIFIC EMBODIMENTS

Figure 1:
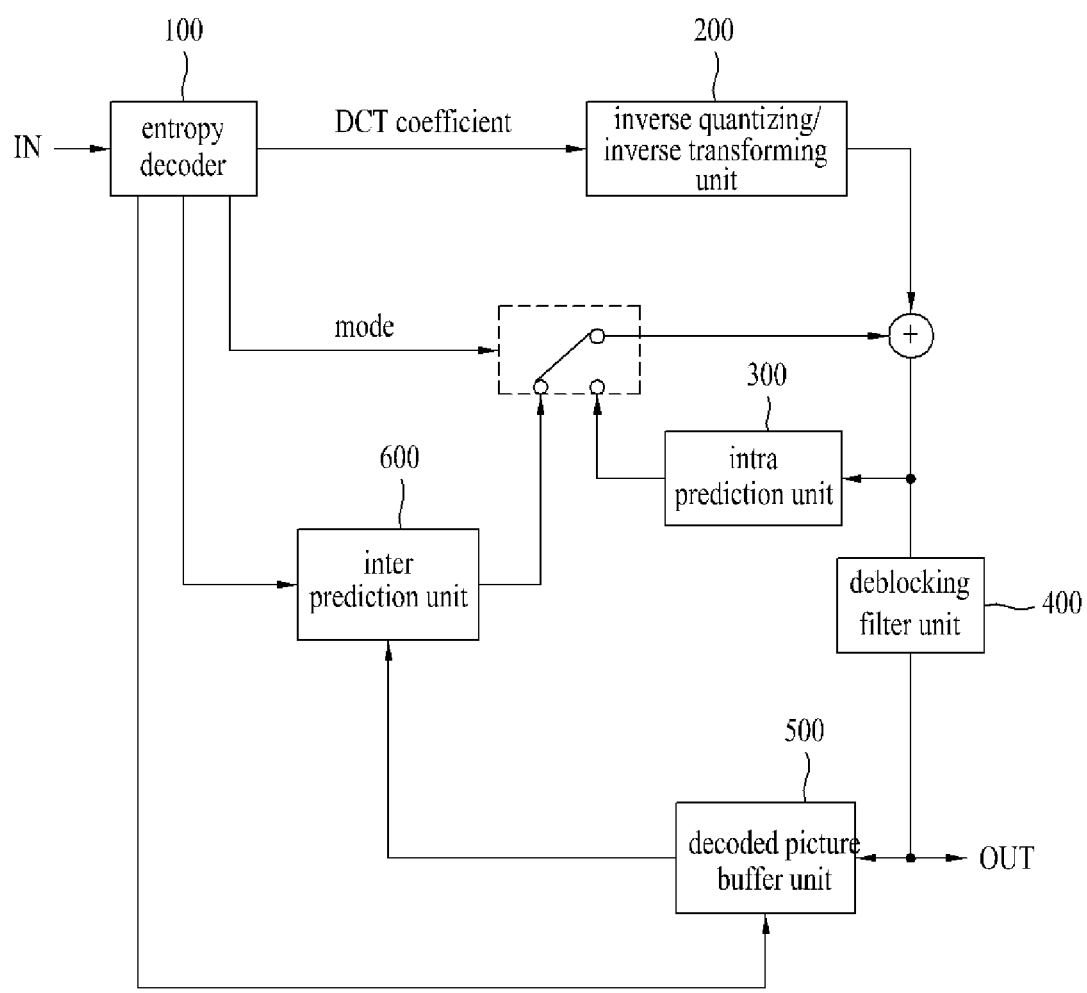
FIG. 1 is a block diagram illustrating an apparatus for decoding a video signal according to an embodiment of the present invention.

Reference will now be made in detail to the preferred embodiments of the present invention, examples of which are illustrated in the accompanying drawings. Wherever possible, the same reference numbers will be used throughout the drawings to refer to the same or like parts. Specific terms used for the exemplary embodiments of the present invention are provided to aid in understanding of the present invention. These specific terms may be replaced with other terms within the scope and spirit of the present invention.

A bitstream of a video signal is defined as a separated hierarchical layer structure that is called a Network Abstraction Layer (NAL) located between a Video Coding Layer (VCL) for handling motion image coding processing and a lower system for transmitting and storing coded information. The coding process outputs VCL data as an output signal, and is mapped in units of an NAL prior to the transmitting or storing of data. Each NAL unit includes a Raw Byte Sequence Payload (RBSP) corresponding to either compressed video data or header information. The RBSP means the moving image compression resultant data.

The NAL unit is basically composed of a NAL header and an RBSP. The NAL header includes not only flag information (nal_ref_idc) for indicating whether a slice serving as an NAL-based reference picture is included, but also ID information (nal_unit_type) for indicating the type of NAL unit. RBSP stores compressed original data, and an RBSP trailing bit is added to the last of the RBSP so as to represent the RBSP length as a multiple of 8 bits. There are a variety of types in such an NAL unit, for example, an Instantaneous Decoding Refresh (IDR) picture, a Sequence Parameter Set (SPS), a Picture Parameter Set (PPS), Supplemental Enhancement Information (SEI), etc.

In addition, the current standard restricts a target or objective product to several profiles and levels in such a manner that the product can be implemented with appropriate costs. It is necessary for a decoder to satisfy predetermined restrictions at a corresponding profile and level. In order to represent functions and parameters of the decoder, two concepts (i.e., a profile and a level) are defined so that the range of a certain compressed image capable of being handled by the decoder can be recognized. Information about which profile incurs a basis of a bitstream can be identified by a profile ID (profile_idc). The profile ID means a flag indicating a profile on which a bitstream is based. For example, in the case of H.264/AVC, a profile ID of 66 means that a bitstream is based on a base line profile, a profile ID of 77 means that a bitstream is based on a main profile, and a profile ID of 88 means that a bitstream is based on an extended profile. The profile ID may be contained in a Sequence Parameter Set (SPS).

The sequence parameter set (SPS) means header information including information related to the coding of the entire sequence. For example, a profile, a level, etc. may be contained in the header information. The entire compressed moving image, i.e., a sequence, must inevitably start from a sequence header, so that the sequence parameter set (SPS) corresponding to header information must arrive at a decoder at an earlier time than data referring to the parameter set. In conclusion, RBSP of the sequence parameter set is used as header information for the moving image compression resultant data. If a bitstream is received, a profile ID identifies which profile is related to an input bitstream.

FIG. 1 is a block diagram illustrating an apparatus for decoding a video signal according to the present invention.

Referring to FIG. 1, the decoding apparatus may generally include an entropy decoder 100, a inverse quantizing/inverse transforming unit 200, an intra prediction unit 300, a deblocking filter unit 400, a decoded picture buffer unit 500, an inter prediction unit 600.

First, the decoding apparatus performs parsing in units of an NAL so as to decode a received video image. Generally, one or more sequence parameters sets (SPSs) and picture parameter sets (PPSs) are transmitted to the decoder before a slice header and slice data are decoded. In this case, a variety of attribute information may be contained in either an NAL header region or an extended region of the NAL header.

The parsed bitstream is entropy decoded through the entropy decoding unit decoding unit 100, a coefficient of each macroblock, a motion vector, etc. are extracted. The inverse quantizing/inverse transforming unit 200 multiplies a received quantized value by a predetermined constant to obtain a transformed coefficient value, inverse-transforms the coefficient value, and reconstructs a pixel value. The intra prediction unit 300 performs intra prediction from a decoded sample contained in a current picture using the reconstructed pixel value. The intra prediction unit 300 predicts a current block using pixels of neighboring blocks of a current block within the current picture. Assuming that more correct prediction is possible, an image quality can be improved and the coding efficiency can also be improved. Therefore, various embodiments for intra prediction will hereinafter be described with reference to the annexed drawings.

Meanwhile, the deblocking filter unit 400 is applied to each coded macroblock so as to reduce block distortion. The filter softens a block edge so as to improve an image quality of a decoded frame. Selection of the filtering process may depend upon boundary strength and a gradient of image samples located in the vicinity of a boundary. Filtered pictures are stored in the decoded picture buffer unit 500 so that the filtered pictures can be output or used as reference pictures.

The decoded picture buffer unit 500 may store or open pre-coded pictures so as to perform inter prediction. In this case, in order to store or open the pre-coded pictures in the decoded picture buffer unit 500, a frame number (frame_num) and Picture Order Count (POC) of each picture are used. In this way, managed reference pictures can be used in the inter prediction unit 600.

Through the above-mentioned process, the inter-predicted pictures and the intra-predicted pictures are selected according to a prediction mode, resulting in a reconstructed current picture. Various embodiments for performing intra prediction will hereinafter be described with reference to drawings from FIG. 2.

Figure 2:
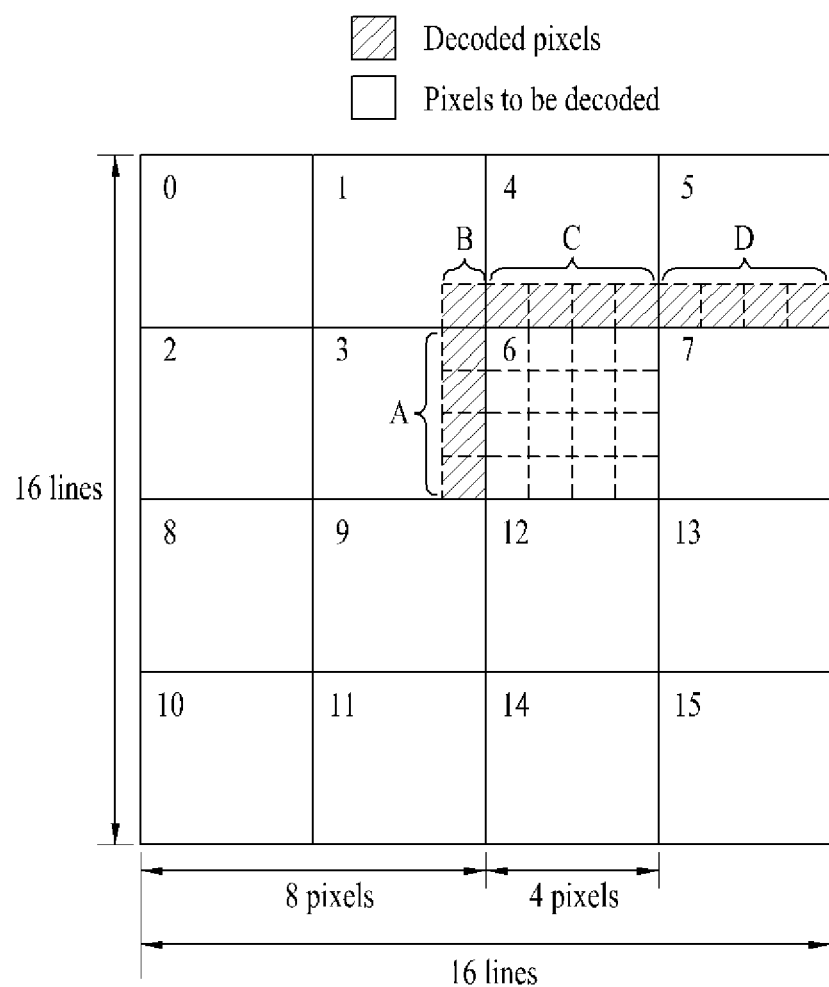
FIG. 2 is a structural view illustrating intra prediction according to an embodiment of the present invention.

FIG. 2 shows a block structure for intra prediction according to an embodiment of the present invention.

During the compression coding of a video signal, intra prediction can be performed using pixel correlation between blocks. Referring to FIG. 2, a coding order and a block (pixel) structure are given to perform 4×4 intra prediction within a 16×16 macroblock. First, coding is performed in the block orders of 0~15 constructing a 16×16 pixel. In addition, for intra prediction of a current block, the pre-coded block from among neighboring blocks of the current block may be used. For example, a left block 3, an upper block 4, a left upper block 1, and a right upper block 5 may be used to perform intra prediction of the current block 6. In this case, intra prediction of the current block can be performed using pixels contained in the left block 3, the upper block 4, the left upper block 1, and the right upper block 5. The pixels may be neighboring pixels A, B, C and D of the current block 6. In this case, the neighboring pixels of the current block may be pixels before or after the filtering. In the case of using the filtering, the number of rounding errors is reduced so that the coding efficiency can be increased. A detailed description of the reduced rounding errors will be described later.

Figure 3:
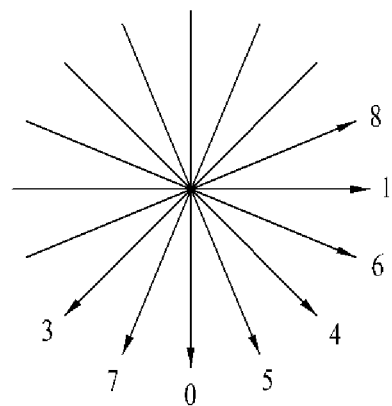
FIG. 3 is a conceptual diagram illustrating a prediction mode for describing intra prediction according to an embodiment of the present invention.

FIG. 3 is a conceptual diagram illustrating a prediction mode for describing intra prediction according to an embodiment of the present invention.

For intra prediction, information about which pixel value of a certain reference block will be used by a current block may be decided. In this case, information about which pixel value of a certain reference block will be used by the current block may be defined by a prediction mode indicating a prediction direction. For example, referring to FIGS. 2 and 3, if a prediction mode of the current block 6 is set to 0, a pixel C of a block 4 vertically adjacent to the current block 6 may be used. If a prediction mode of the current block 6 is set to 1, a pixel A of a block 3 horizontally adjacent to the current block 6 may be used. If a prediction mode of the current block 6 is set to 2, pixels A and C of the blocks 3 and 4 that are horizontally and vertically adjacent to the current block 6 may be used. If a prediction mode of the current block 6 is set to 3 or 7, pixels C and D of the upper block 4 and the right upper block 5 may be used. If a prediction mode of the current block 6 is set to 4, 5, or 6, pixels A, B and C of the left block 3, the left upper block 1, and the upper block 4 may be used. If a prediction mode of the current block 6 is set to 5, pixels A and C of blocks 3 and 4 horizontally and vertically adjacent to the current block 6 may be used. If a prediction mode of the current block 6 is set to 8, a pixel A of the left block 3 may be used. For example, values of neighboring pixels may be used as those of pixels used for intra prediction of the current block without any change. For another example, modified pixel values may be used in consideration of correlation between contiguous pixels. For another example, interpolation- or extrapolation-processed pixel values may be used as pixels for intra prediction of the current block. Otherwise, a combination of the above-mentioned examples may also be used as necessary. Hereinafter, the above-mentioned examples will be described in detail.

Figure 4:
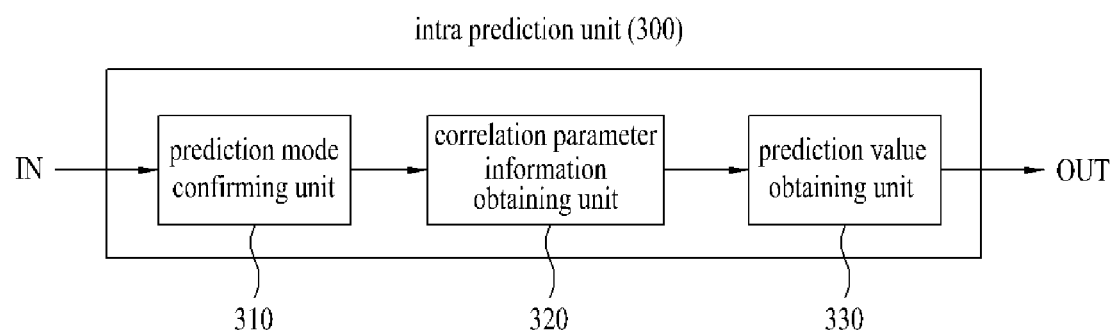
FIG. 4 is a detailed block diagram illustrating an intra prediction unit for obtaining a prediction value using correlation between pixels according to an embodiment of the present invention.

FIG. 4 is a detailed block diagram illustrating an intra prediction unit 300 for obtaining a prediction value using correlation between pixels according to an embodiment of the present invention.

Referring to FIG. 4, the intra prediction unit 300 includes a prediction mode confirming unit 310, a correlation parameter information obtaining unit 320, and a prediction value obtaining unit 330.

As previously stated in FIG. 3, the modified pixel values may be used in consideration of correlation between pre-coded pixels for intra prediction. For example, correlation between pixels may represent a tendency of pixel values of individual pixels, and may also represent a variation pattern of pixel values according to pixel positions or a difference between pixels. In the case of using the modified pixel values in consideration of correlation between pixels, it is necessary to modify a conventional prediction mode or define a new prediction mode.

First, the prediction mode confirming unit 310 confirms a block type of a current macroblock so that it can confirm a prediction mode of the current macroblock. Otherwise, a newly defined prediction mode different from a conventional intra prediction mode may be confirmed. If the intra prediction is performed using a pixel value obtained when the current macroblock is modified according to the prediction mode, the correlation parameter information obtaining unit 320 may obtain correlation parameter information to obtain the modified pixel value. In this case, the correlation parameter information may represent variables which are generated in consideration of a tendency of pixel values of the coded pixels, a variation pattern of pixel values depending on positions of the coded pixels or a difference between pixels. For example, if a variation of pixel values depending on positions of the coded pixels has a tendency to be linearly increased or decreased, the correlation parameter information may be obtained using a linear function for indicating a linear increase or decrease. For another example, if pixel values depending on the positions of the coded pixels are irregularly changed, a least square estimation method is used to obtain the aforementioned correlation parameter information. In this case, two or more correlation parameter information may be obtained according to the degree of pixel value variation.

Likewise, if the correlation parameter information is obtained, the prediction value obtaining unit 330 may obtain a predicted pixel value using the obtained correlation parameter information and the pre-coded pixel value. A detailed description of a method for obtaining the correlation parameter information will hereinafter be described with reference to the annexed drawings.

FIGS. 5A to 8 show various examples for obtaining a predicted pixel value under an intra 4×4 vertical prediction mode according to the present invention.

FIGS. 5A and 5B show a current 4×4 block and pixels adjacent to the 4×4 block. Although the pixels may represent pre-coded pixels obtained before the current block, the scope or spirit of the present invention is not limited thereto. Pixels (I, J, K and L) indicate pixels contiguous to a left boundary of the current block, a pixel M indicates a pixel that is diagonally adjacent to the left upper pixel of the current block, and pixels (A, B, C and D) indicate pixels adjacent to an upper boundary of the current block. Assuming that the left upper pixel position of the current block is denoted by (0,0), coordinates of each pixel in the current block is shown in FIGS. 5A and 5B. If the prediction mode of the current block indicates a vertical prediction mode, the estimated value of pixels in the current block can be obtained using pixels A, B, C and D adjacent to the upper side of the current block. In this case, the following equation 1 may be used.

$$\text{pred}4\times4_L[x,y]=p[x,-1], \text{ where } x,y=0\ldots 3 \quad \text{[Equation 1]}$$

In Equation 1, 'x' or 'y' indicates a position of a pixel in the current block, and 'pred4×4$_L$[x,y]' is a predicted value of each pixel.

In accordance with embodiments of the present invention, a predicted value of the current block can be obtained in consideration of a variation pattern of pixels adjacent to the current block. For example, if the prediction mode of the current block indicates a vertical mode, the embodiment does not use a value of a pixel adjacent to the upper side of the current block without any change as shown in Equation 1, and can obtain a prediction value in consideration of a variation of pixel values adjacent to the current block. In this case, although a neighboring pixel to be used may be at least one of pixels (I, J, K and L) adjacent to the left side of the current block, a pixel M adjacent to the left upper side, and a pixel adjacent to a left lower side of the current block, the scope or spirit of the present invention is not limited thereto. Accordingly, it is necessary to obtain correlation parameter information in which a variation in values of pixels adjacent to the current block is reflected.

Figure 6:
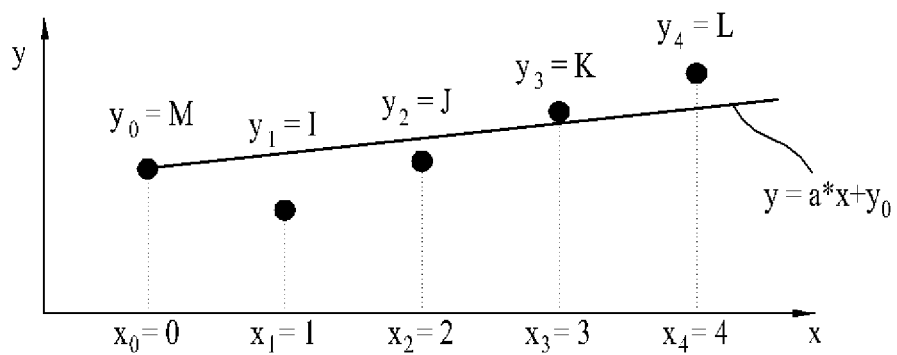

FIG. 6 shows pixels (I, J, K and L) adjacent to the left side of the current block and a pixel value depending on the position of a pixel M adjacent to the left upper side of the current block. In FIG. 6, an X axis represents positions of pixels (I, J, K and L) adjacent to the left side of the current block based on the pixel M adjacent to the left upper side, and a Y axis represents a pixel value. In this case, assuming that a variation pattern of pixels adjacent to the current block is linear based on the pixel M, correlation parameter information shown in the following Equation 3 can be obtained using a least square estimation method shown in the following Equation 2.

$$\operatorname*{argmin}_{a} \sum_{i=0}^{4} (ax_i + y_0 - y_i)^2. \quad \text{[Equation 2]}$$

$$a = \frac{\sum x_i y_i - y_0 \sum x_i}{\sum x_i^2} = \frac{I + 2J + 3K + 4L - 10M}{30}. \quad \text{[Equation 3]}$$

In the above-mentioned embodiment, correlation parameter information is obtained based on a pixel M. That is, a value of the pixel M is substituted into a value of $y_0$ shown in Equation 2, so that correlation parameter information can be obtained using a difference value between the pixel M and neighboring pixels.

Figure 7:
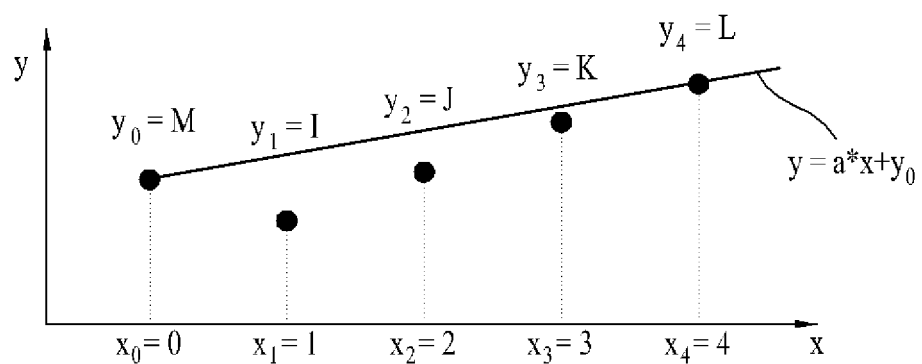

Referring to FIG. 7 showing another embodiment for obtaining such correlation parameter information, on the assumption that a variation pattern of contiguous pixels of the current block is configure in the form of a linear form by which the pixel M is linearly connected to another pixel P located farthest from the pixel M, the correlation parameter information may be obtained. In this case, the correlation parameter information can be obtained by the following equation 4.

$$a = \frac{L-M}{4}. \quad \text{[Equation 4]}$$

-continued
$$a = \frac{L-M}{4}$$

The embodiments described in FIGS. 6 and 7 have illustrated various examples for obtaining correlation parameter information on the assumption that a variation pattern of neighboring pixels of the current block is linear.

Figure 8:
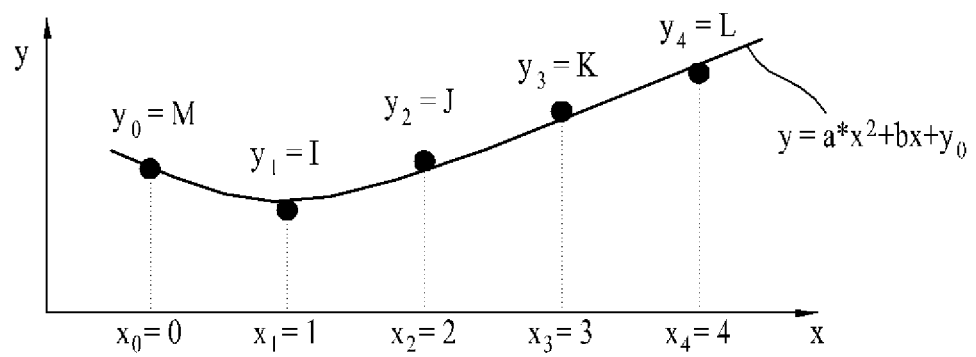

FIG. 8 shows another embodiment of the present invention. In more detail, FIG. 8 shows a method for obtaining correlation parameter information on the assumption that a variation pattern of neighboring pixels of a current block is non-linear.

In the same manner as in FIG. 6, FIG. 8 shows pixels (I, J, K and L) adjacent to the left side of the current block and a pixel value based on the position of a pixel M adjacent to the left upper side of the current block. In this case, on the assumption that a variation pattern of pixels adjacent to the current block is non-linear based on the pixel M, correlation parameter information can be obtained using the least square estimation method of Equation 5.

$$\operatorname*{argmin}_{a,b} \sum_{i=0}^{4} (ax_i^2 + bx_i + y_0 - y_i)^2. \quad \text{[Equation 5]}$$

In Equation 5, 'a' or 'b' represents correlation parameter information. The correlation parameter information may be obtained through Equations 2 to 3.

The obtained correlation parameter information may be used to obtain an intra prediction value of the current block. For example, if the prediction mode of the current block is a 4×4 vertical prediction mode, prediction values of pixels in the current block may be obtained using not only pixels (A, B, C and D) adjacent to the upper side of the current block but also the correlation parameter information. In this case, the following equation 6 may be used as necessary.

$$\text{pred}4\times4_L[x,y]=\text{round}((y+1)*a+p[x,y-1]), \text{ where } x,y=0\ldots 3\text{[Equation6]}$$

In Equation 6, 'x' or 'y' represents a position of a pixel in the current block, 'a' represents correlation parameter information, and 'pred4×4$_L$[x,y]' represents a prediction value of each pixel. Equation 6 may be used when pixels have a linear variation pattern. If pixels have a non-linear variation pattern, an equation in which the correlation parameter information 'a' and 'b' is used may be additionally defined. On the assumption that a variation pattern of pixels adjacent to the current block is linear, FIG. 5A shows intra prediction values of individual pixels. On the assumption that a variation pattern of pixels adjacent to the current block is non-linear, FIG. 5B shows intra prediction values of individual pixels.

In accordance with another embodiment of the present invention, if a prediction mode of the current block is an intra 4×4 horizontal prediction mode, a prediction value of each pixel in the current block may be obtained through pixels (I, J, K and L) adjacent to the left side of the current block. In this case, the following equation 7 may be used.

$$\text{pred}4\times4_L[x,y]=p[-1,y], \text{ where } x,y=0\ldots 3 \quad \text{[Equation 7]}$$

In equation 7, 'x' or 'y' represents a position of a pixel in the current block, and 'pred4×4$_L$[x,y]' represents a prediction value of each pixel. The same scheme as that of the intra 4×4 vertical prediction mode described in FIGS. 5A to 8 may be applied to the embodiments of the present invention.

For example, as can be seen from FIG. 7, the embodiment does not use values of pixels adjacent to the left side of the current block without any change, and can obtain a prediction value in consideration of a variation in values of pixels adjacent to the current block. In this case, although the contiguous pixel to be used may be at least one of pixels (A, B, C and D) adjacent to the upper side of the current block, a pixel M adjacent to the left upper side, and a pixel (not shown) adjacent to the right upper side, the scope or spirit of the present invention is not limited thereto.

The embodiment can obtain correlation parameter information using the schemes shown in FIGS. 5A to 8, and the obtained correlation parameter information may be used to obtain an intra prediction value of the current block. For example, on the assumption that a prediction mode of the current block is an intra 4×4 horizontal prediction mode, a prediction value of each pixel in the current block can be obtained using not only pixels (I, J, K and L) adjacent to the left side of the current block but also the correlation parameter information. In this case, the following equation 8 may be used.

$$\text{pred}4\times4_L[x,y]=\text{round}((x+1)*a+p[x-1,y]), \text{ where } x,y=0\ldots 3 \quad \text{[Equation 8]}$$

In equation 8, 'x' or 'y' represents a position of a pixel in the current block, and 'pred4×4$_L$[x,y]' represents a prediction value of each pixel.

Although the above-mentioned embodiment has been disclosed based on only pixels adjacent to the current block, the scope or spirit of the present invention is not limited thereto. For example, referring to FIG. 5A, a prediction value of a column of the pixel A can be obtained in consideration of a variation pattern of pixels in a column of the pixel M, and a prediction value of a column of the pixel B can be obtained in consideration of a variation pattern of a column of the obtained pixel A. The same method as described above may also be applied to a pixel (C) column and a pixel (D) column. Such methods may also be applied to the following embodiments as necessary.

In accordance with another embodiment of the present invention, prediction values of pixels in the current block can be obtained through at least one of pixels (A, B, C and D) adjacent to the upper side of the current block, a pixel M adjacent to the left upper side, and pixels (I, J, K and L) adjacent to the left side of the current block. For example, the embodiment of the present invention may obtain correlation parameter information in consideration of pixel value variation patterns of upper and left pixels adjacent to the current block. In this case, the aforementioned vertical prediction mode may be applied to a pixel value variation pattern of the upper pixel, and the aforementioned horizontal prediction mode may be applied to a pixel value variation pattern of the left pixel.

In more detail, if the prediction mode of the current block is an intra 4×4 diagonal down-left prediction mode, correlation parameter information may be obtained considering all pixel value variation patterns of the upper and left pixels adjacent to the current block. A prediction value of the current block can be obtained using the obtained correlation parameter information, as represented by the following equation 9.

$$\text{pred}4\times4_L[x,y]=\text{pred}4\times4_L[x,y]_{PIX}+\text{round}(-a_H*(y+1)+av*(x+1)), \text{ wherein } x,y=0\ldots 3 \quad \text{[Equation 9]}$$

In this case, 'x,y=0 . . . 3' represents a position of pixels in the current block, '$a_H$' represents correlation parameter information considering a pixel value variation pattern of an upper pixel adjacent to the current block, and 'av' represents correlation parameter information considering a pixel value variation pattern of a left pixel adjacent to the current block. In addition, 'pred4×4$_L$[x,y]' represents a prediction value of each pixel in the current block, and 'pred4×4$_L$[x,y]$_{PIX}$' represents a prediction value obtained without considering a variation pattern of contiguous pixels.

In the same manner as described above, on the assumption that a prediction mode of the current block is an intra 4×4 diagonal down-right prediction mode, an intra 4×4 vertical right prediction mode, an intra 4×4 horizontal-down prediction mode, an intra 4×4 vertical left prediction mode, or an intra 4×4 horizontal-up prediction mode, a prediction value of the current block can be obtained as shown in the following equations 10 to 14.

$$\text{pred}4\times4_L[x,y]=\text{pred}4\times4_L[x,y]_{PIX}+\text{round}(a_H*(y+1)+av*(x+1)) \quad \text{[Equation 10]}$$

$$\text{pred}4\times4_L[x,y]=\text{pred}4\times4_L[x,y]_{PIX}+\text{round}(a_H*(y+1)+av*(x+1)) \quad \text{[Equation 11]}$$

$$\text{pred}4\times4_L[x,y]=\text{pred}4\times4_L[x,y]_{PIX}+\text{round}(a_H*(y+1)+av*(x+1)) \quad \text{[Equation 12]}$$

$$\text{pred}4\times4_L[x,y]=\text{pred}4\times4_L[x,y]_{PIX}+\text{round}(-a_H*(y+1)+av*(x+1)) \quad \text{[Equation 13]}$$

$$\text{pred}4\times4_L[x,y]=\text{pred}4\times4_L[x,y]_{PIX}+\text{round}(a_H*(y+1)-av*(x+1)) \quad \text{[Equation 14]}$$

Equations 9 to 14 illustrate one embodiment of the present invention. In another embodiment, a weight considering a prediction direction may be assigned to the horizontal or vertical parameter information.

Although the above-mentioned embodiments have been disclosed based on only the 4×4 block, a technical idea of the present invention may also be applied to other blocks (e.g., 8×8 block, 16×16 block, 32×32 block, 64×64 block, etc.) without departing from the spirit or scope of the present invention. In addition, a prediction method according to the present invention may modify a prediction value obtaining process based on a conventional prediction mode or may be designed to define a new prediction mode.

Figure 9:
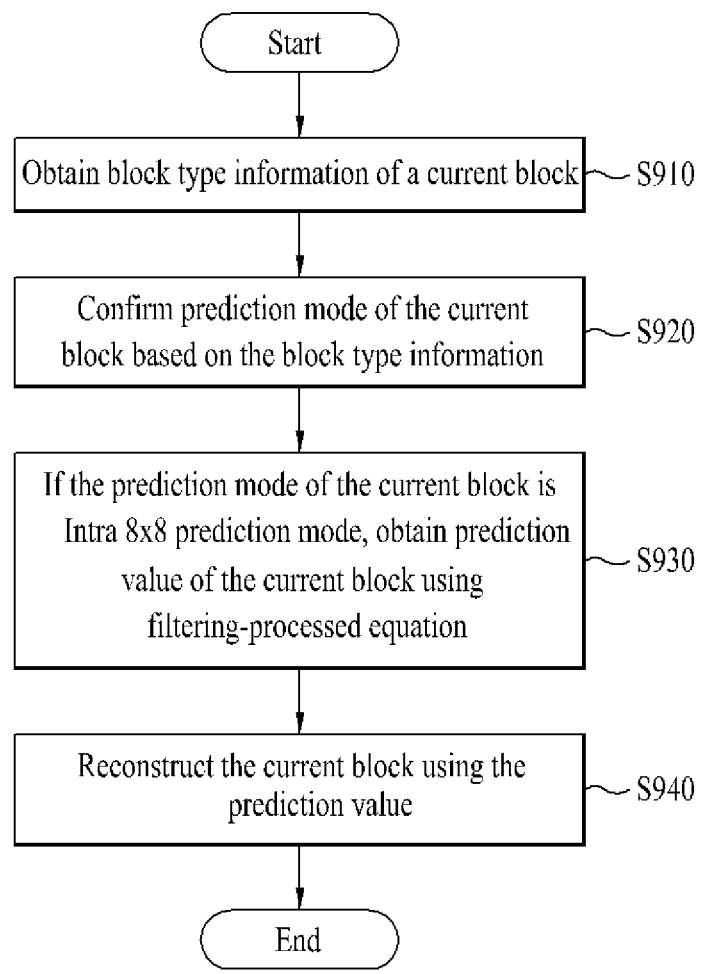
FIG. 9 is a flowchart illustrating an intra prediction method for reducing rounding errors according to an embodiment of the present invention.

FIG. 9 is a flowchart illustrating an intra prediction method for reducing rounding errors according to an embodiment of the present invention.

Referring to FIG. 9, a block type of the current block can be obtained from a block layer (Step S910). A prediction mode of the current block can be confirmed (Step S920). If the prediction mode of the current block is an intra 8×8 prediction mode, intra 8×8 prediction is performed.

During the intra prediction, information about whether reference pixels are filtered may affect the improvement of coding efficiency or image quality. In this case, the reference pixels may represent pixels adjacent to the current block, and may be used to generate a prediction value. For example, pixels A, B, C, D, M, I, J, K and L shown in FIG. 5A may be used as such reference pixels. For another example, the reference pixels may represent a value (for example, an interpolation pixel, a filtered pixel, etc.) derived from pixels adjacent to the current block, Therefore, in the case of using the filtered value as such a reference pixel, one or more rounding errors may be encountered in the filtering process. The rounding error is generated in various operations (e.g., rounding-up, ceiling, and floor operations). For example, referring to FIG. 5A, pixels (B, C and D) adjacent to the upper side of the current block and pixels (not shown) adjacent to the right upper side of the current block are filtered using the following equation 15.

$$p'[x,-1]=(p[x-1,-1]+2*p[x,-1]+p[x+1,-1]+2)>>2,$$
where $x=1 \ldots 7$ [Equation 15]

When intra prediction is performed using such filtered reference pixels, the rounding error may be re-generated in a process of obtaining a prediction value. For example, if a prediction mode of the current block is a diagonal down-left prediction mode, a prediction value can be obtained using the following equation 16.

$$pred8\times8_L[x,y]=(p'[x+y,-1]+2*p'[x+y+1,-1]+p'[x+y+2,-1]+2)>>2, \text{ where } x,y=0 \ldots 7$$ [Equation 16]

In Equation 16, p'[x,y] indicates a filtered reference pixel.

If the number of rounding errors repeatedly generated in the filtering process and the prediction value obtaining process is reduced, accuracy of prediction may be enhanced. Therefore, assuming that the filtering process and the prediction value obtaining process are combined into one equation, the number of rounding errors can be reduced.

For example, if Equation 15 and Equation 16 are combined into one equation, the following equation 17 can be obtained.

$$pred8\times8_L[x,y]=(p[x+y-1,-1]+4*p[x+y,-1]+6*p[x+y+1,-1]+4*p[x+y+2,-1]+p[x+y+3,-1]+8)>>4$$ [Equation 17]

That is, with reference to Equation 17, a prediction value can be obtained using a reference pixel instead of the filtered pixel. In this case, filtering may be applied to Equation 17. Therefore, a prediction value of the current block can be obtained using Equation 17 to which the filtering is applied (Step S930). The current block may be reconstructed using the prediction value (Step S940).

Although the embodiment shown in FIG. 9 has been disclosed based on the 8×8 block, a technical idea of the present invention may also be applied to other blocks (e.g., 4×4 block, 16×16 block, 32×32 block, 64×64 block, etc.) without departing from the spirit or scope of the present invention. In addition, the embodiment shown in FIG. 9 may also be applied to a prediction mode having repeated rounding errors from among 9 prediction modes of FIG. 3. Further, the embodiment of FIG. 9 may also be applied not only to a part for intra prediction but also a part having repeated rounding errors throughout the whole decoding process.

Figure 10:
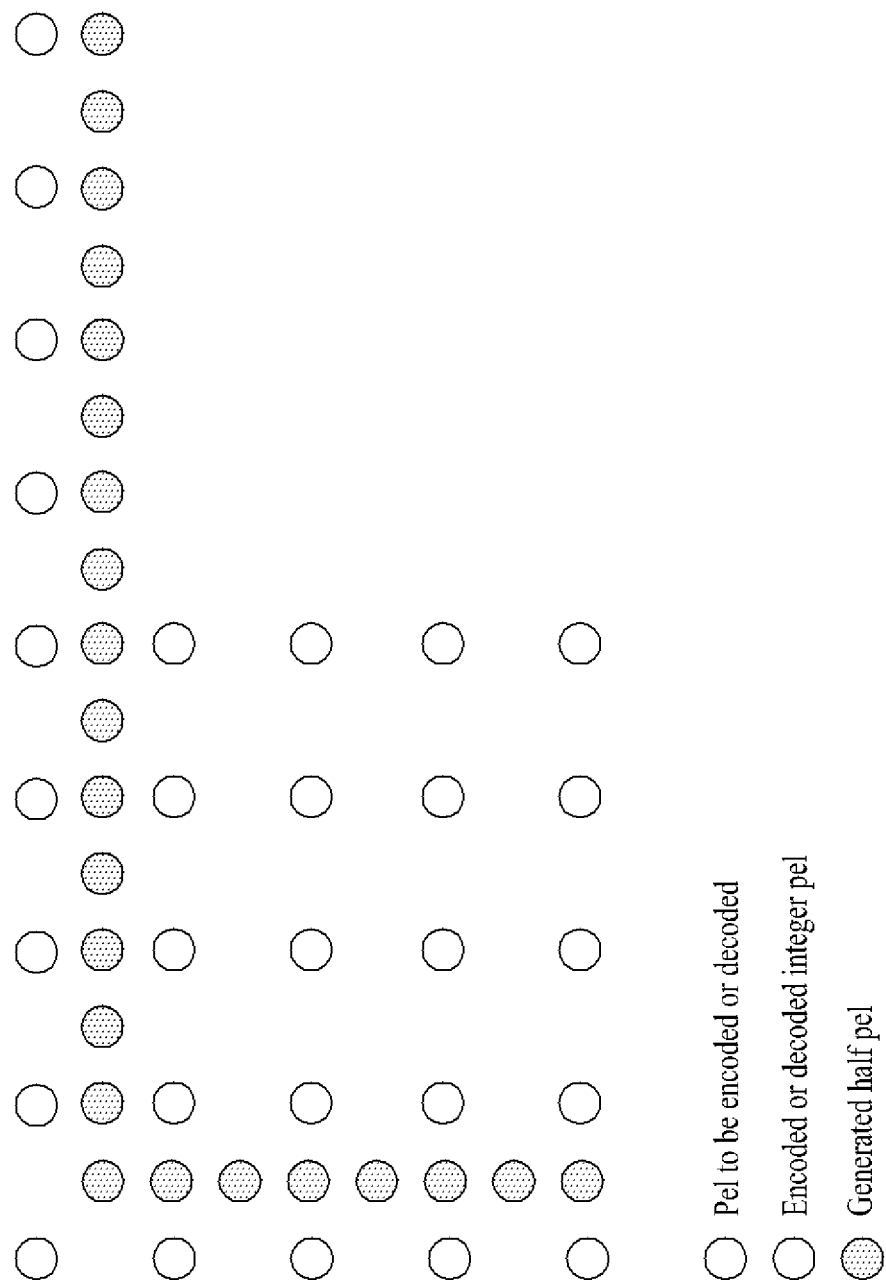
FIG. 10 is a structural view illustrating a pixel given to describe a method for performing intra prediction using a half pixel generated from an integer pixel according to an embodiment of the present invention.

FIG. 10 is a structural view illustrating a pixel given to describe a method for performing intra prediction using a half pixel generated from an integer pixel according to an embodiment of the present invention.

Referring to FIG. 10, the current block includes a plurality of pixels to be encoded (or decoded), and pre-encoded (or pre-decoded) integer pixels are located in neighboring regions (left side, left upper side, upper side, and right upper side regions) of the pixels. It can be recognized that a half pixel (or half pel) is located between a pixel of the current block and an integer pixel (or integer pel) of a neighboring block. If the left upper pixel of the current block is located at (0,0), the position of the half pixel may be represented by the following equation 18.

Half pixel$(x,y)=(m/c,n/c)$ [Equation 18]

In Equation 18, at least one of 'm' and 'n' is '−1', and 'c' is a constant indicating an integer.

In the same manner as in the integer pixel, the half pixel may be present in a left region, a left upper region, an upper region, and a right upper region of the current block. Various embodiments may be used for generating such a half pixel. The half pixel can be generated using the integer pixel in each neighboring pixel of the current block and a filter. For example, a first half pixel may be generated using at least two integer pixels in a neighboring pixel of the current block and a vertical filter. In addition, a second half pixel can be generated using at least two integer pixels in a neighboring pixel of the current block and the horizontal filter. In this case, the aforementioned neighboring block may include a left block, a left upper block, an upper block, and a right upper block contiguous to the current block. Otherwise, the neighboring block may represent a pre-coded block adjacent to the current block. The first or second half pixel may be a half pixel adjacent to the current block.

In addition, a third half pixel may be generated using the first half pixel and the horizontal filter, and a fourth half pixel may be generated using the second half pixel and the vertical filter. Furthermore, more precise pixel may be generated by a combination of an integer pixel and a pre-generated half pixel.

When performing intra prediction using the aforementioned half pixels, accuracy of prediction may be enhanced.

Meanwhile, the encoding apparatus (not shown) may decide a prediction mode of the current block using at least one of a half pixel and an integer pixel. For example, a coding efficiency in the case of using the half pixel, a coding efficiency in the case of using the integer pixel, and a coding efficiency in the case of using both the half pixel and the integer pixel are calculated, and an optimum coding efficiency is selected from among the calculated coding efficiency results, so that the encoding apparatus may decide a prediction mode according to the selected result. In addition, information about the prediction mode may be transmitted to the decoding apparatus. In this case, the prediction mode may be newly defined, or the intra prediction process may be modified under the control of a conventional prediction mode. For example, if a prediction mode using the half pixel (half_pel_pred_mode) is newly defined, the prediction mode (half_pel_pred_mode) may be defined as nine prediction modes in the same manner as in FIG. 3, or may also be defined as only some of the nine prediction modes as necessary.

In accordance with another embodiment of the present invention, current block's integer pixels padded to neighboring blocks of the current block may be used to generate half pixels. For example, assuming that a prediction mode of the current block is a padding mode, predetermined values are padded to pixels of the current block, and half pixels can be generated using the padded integer blocks and the integer pixels of each neighboring block. In this case, the padding mode indicates a prediction direction. In other words, the padding mode means the direction of integer pixels to be used when a value of an integer pixel present in a neighboring block of the current block is set to a pixel value of the current block.

Likewise, if the intra prediction is performed using half pixels obtained using the padding mode, accuracy of prediction may be enhanced.

A technical idea of the aforementioned embodiments can also be applied to other embodiments of the present invention, and a combination of individual embodiments may also be possible although not all the embodiments are disclosed. For example, when generating the half pixel described above, correlation parameter information may be generated in consideration of correlation of neighboring pixels disclosed in FIGS. 4 to 8. In other words, it is possible to generate half pixels to which correlation parameter information is applied, and a new prediction mode for indicating the generated half pixels may be defined.

In accordance with another embodiment of the present invention, if a current block is located at a boundary of a picture, this embodiment can generate pixels located outside of the boundary of the picture using pixels in the picture. In addition, since the generated pixels are further used in the embodiment, accuracy of prediction may be enhanced. In this case, pixels located outside of the boundary of the picture may be generated using at least one of interpolation, filtering, and padding.

In accordance with another embodiment of the present invention, the embodiment proposes, when reconstructing a current picture using intra prediction, a new intra prediction mode for simultaneously reconstructing a plurality of blocks constructing the current picture in units of a pixel, differently from a reconstructing method in which a current picture is reconstructed in a zigzag direction in units of a block. In more detail, the above-mentioned embodiment allows pixels belonging to several blocks constructing a current picture to sequentially perform intra prediction according to a prediction order, whereas a conventional method performs intra prediction at a left upper block adjacent to the current picture and then performs such intra prediction at a right block adjacent to the current picture.

For example, a first pixel of the current block can be predicted using neighboring blocks located in a previous frame that has been primarily reconstructed. In this case, although a first pixel to be initially intra-predicted in the current block may be a pixel located at the right lower end in the current block, the scope or spirit of the first pixel is not limited thereto. After that, intra prediction of neighboring pixels is performed using the first pixel, pixel prediction information, and residual. The pixel prediction information may include at least one of a prediction pixel (predictor) used for intra prediction of each neighboring pixel, a prediction method, and a prediction direction.

In more detail, a first pixel located at the right lower end in the current block is initially intra-predicted using pixels located in a previous frame. In this case, the prediction mode for predicting the first pixel may use all of the nine prediction modes described above. Intra prediction of the second pixel may be performed using the first pixel. Although the prediction mode according to the embodiment of the present invention may use the following two methods as an intra prediction mode for the second to N-th pixels (other than the first pixel), the scope or spirit of the present invention is not limited thereto.

A first method is an averaging mode for performing prediction using an average value of neighboring pixels, and a second method is a directional mode for performing prediction according to a direction or directivity. That is, the first method determines a pixel corresponding to an average value of the closest neighboring pixels to the current pixel where intra prediction is to be performed to be a prediction pixel, and then performs intra prediction of the current pixel. The second method calculates a difference between two pixels located closest to the current pixel in each of 8 directions based on the current pixel, and determines one direction having the smallest difference to be a prediction direction. A pixel corresponding to an average value of two pixels located closest to the current pixel in the selected prediction direction is determined to be a prediction pixel of the current pixel, such that intra prediction of the current pixel is performed. In this case, in case of the second pixel, intra prediction may be carried out using an average value of first pixels, a difference between first pixels located in a first direction from the second pixel is calculated, and a pixel corresponding to an average value of the first pixel is used as a prediction pixel, resulting in execution of intra prediction.

In addition, in case of the third pixel, each of first and second pixels where neighboring prediction is completed is used as a prediction pixel of the third pixel, and intra prediction of the third pixel is performed. The third pixel may use a pixel corresponding to an average value of first and second pixels adjacent to each other as a prediction pixel.

In addition, in case of the fourth pixel, each of first to third pixels where prediction is completed is used as a prediction pixel of the fourth pixel, and intra prediction of the fourth pixel is performed. The fourth pixel may use a pixel corresponding to an average value of first to third pixels adjacent to one another as a prediction pixel.

In addition, in case of the fifth pixel, each of first to fourth pixels where prediction is completed is used as a prediction pixel of the fifth pixel, and intra prediction of the fifth pixel is performed. The fifth pixel may use a pixel corresponding to an average value of first to third pixels adjacent to one another as a prediction pixel. For example, the embodiment calculates a difference between two pixels in each of a first direction including third and fourth pixels and a second direction including first and second pixels, compares the difference derived from the first direction with the other difference derived from the second direction, and decides one direction having a smaller difference to be a prediction direction. If it is assumed that the first direction is selected as a prediction direction, a prediction pixel for performing intra prediction of the fifth pixel may be a pixel corresponding to an average of the third and fourth pixels adjacent to the fifth pixel in the first direction.

As described above, intra prediction from the sixth pixel to the $16^{th}$ pixels can be performed using prediction-completed neighboring pixels.

Meanwhile, whenever intra prediction is performed in the range from the first pixel to the N-th pixel and pixel prediction information and residual of each pixel are generated, the encoding apparatus (not shown) determines whether intra prediction of the current block is completed. If the intra prediction of the current block is completed, the encoding apparatus transmits pixel prediction information and residual of the first to N-th pixels.

The intra prediction unit 300 for use in the apparatus for decoding a video signal according to the present invention receives pixel prediction information and residuals of the first to N-th pixels, thereby reconstructing the current block. First, the intra prediction unit 300 reconstructs a first pixel of the current block using the received pixel prediction information and residual of the first pixel, and reconstructs a second pixel of the current block using the reconstructed first pixel and pixel prediction information and residual of the second pixel. In this way, the intra prediction unit 300 sequentially reconstructs the remaining pixels to the N-th pixel, so that the current block can be completely reconstructed.

As described above, the method for decoding a video signal according to the second embodiment of the present invention uses applies only pixels of neighboring blocks of the current block but also neighboring pixels of the current block to the process of intra prediction, so that more accurate prediction is possible. In addition, the decoding method according to the second embodiment of the present invention performs prediction using a predictor value selected from among two or more directions, so that a block having many more zero coefficients is generated in a discrete cosine transform (DCT) operation, resulting in increased coding efficiency.

In accordance with another embodiment of the present invention, the present invention proposes an intra skip mode for performing intra prediction of the current block. The intra skip mode, if a predetermined condition is given, uses pixel values of neighboring blocks without performing prediction based on the neighboring blocks.

The conventional intra prediction uses a 16×16 block, a 8×8 block, and a 4×4 block, and is performed out using 9 intra prediction modes. However, assuming that the intra prediction mode is required due to the reduction in correlation between screen images and a current block and neighboring blocks are homogeneous, a method for using the neighboring blocks without any change may be more efficient than the conventional intra prediction method.

Provided that a current block uses the intra skip mode and higher efficiency is given, the encoding apparatus (not shown) selects an intra skip mode, decides a prediction block, and transmit intra skip information and the selected prediction block information to the decoding apparatus. In this case, the intra skip information may be flag information (intra_skip_flag) indicating whether a current block uses the intra skip mode.

If the intra skip mode flag information (intra_skip_flag) is set to '1', a value of a reference pixel in a neighboring block may be used as a pixel value of the current block without any change. In contrast, if the intra skip mode is not performed in the current block, it is possible to reconstruct the current block using the conventional intra prediction method (or other intra prediction methods described above).

As described above, in the case of using the intra skip mode according to the present invention, a video signal, that is inefficient in inter prediction and is homogenous to neighboring blocks, can be effectively predicted and reconstructed. In addition, the apparatus or method of the present invention need not perform intra prediction and need not transmit residual and CBP (Coded Block Pattern), resulting in a reduction in bit rate.

As described above, the above-mentioned embodiments of the present invention may be implemented as a computer-readable code stored in a recording medium including a program. The computer-readable recording medium may include all kinds of recording devices, each of which stores data readable by a computer system. For example, the computer-readable recording medium may be a ROM, a RAM, a CD-ROM, a magnetic tape, a floppy disc, an optical-data storage unit, or the like. For another example, the computer-readable storage medium may also be implemented in the form of carrier waves (e.g., data transmission over the Internet). In addition, a bitstream generated by the inventive encoding method may be stored in a computer-readable storage medium or may be transmitted over a wired/wireless communication network.

As apparent from the above description, the exemplary embodiment of the present invention has the following effects.

The embodiment of the present invention obtains a prediction value of a current block in consideration of a tendency or variation of pixels neighboring with the current block, so that it can perform more accurate prediction.

When filtering a reference pixel to obtain a more accurate intra prediction value, the embodiment of the present invention reduces rounding errors repeatedly encountered in the filtering process and the process for obtaining the prediction value, resulting in implementation of more accurate prediction.

In addition, if a current block is located at a boundary between pictures, the embodiment of the present invention can generate pixels located outside of the boundary using pixels in each picture. In addition, the embodiment of the present invention also uses the generated pixels, resulting in implementation of more accurate prediction.

In addition, the embodiment of the present invention performs intra prediction of a current block using a half pixel of a neighboring region, resulting in implementation of more accurate prediction.

If the embodiment of the present invention uses an intra skip mode, it may efficiently predict or reconstruct a video signal which incurs inefficient inter prediction and is very similar to those of neighboring blocks. In this case, the embodiment of the present invention does not perform prediction and need not transmit CBP (Coded Block Pattern) and residual, resulting in reduction in a used bit rate.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for decoding a video signal, the method performed by an apparatus and comprising:
    determining an intra prediction mode for a current block;
    based on the determined intra prediction mode being an intra vertical prediction mode, obtaining a prediction value of a pixel in the current block based on a value of a top neighboring pixel adjacent to the current block and a difference between a value of a top-left neighboring pixel adjacent to the current block and a value of a left neighboring pixel adjacent to the current block, the pixel in the current block having a same x-coordinate as the top neighboring pixel; and
    reconstructing the current block based on the obtained prediction value.

2. The method of claim 1, wherein reconstructing the current block includes:
    obtaining residual information of the current block; and
    reconstructing the pixel in the current block based on the residual information and the prediction value of the pixel in the current block.

3. The method of claim 1, wherein the left neighboring pixel is a left neighboring reference pixel adjacent to a left-bottom corner pixel of the current block.

4. The method of claim 1, wherein the pixel in the current block is located at a bottom boundary of the current block.

5. The method of claim 1, wherein the current block is one of a 16×16 block, a 8×8 block, or a 4×4 block.

6. An apparatus configured to decode a video signal, the apparatus comprising:
    a decoder configured to:
    determine an intra prediction mode for a current block;
    based on the determined intra prediction mode being an intra vertical prediction mode, obtain a prediction value of a pixel in the current block based on a value of a top neighboring pixel adjacent to the current block and a difference between a value of a top-left neighboring pixel adjacent to the current block and a value of a left neighboring pixel adjacent to the current block, the pixel in the current block having a same x-coordinate as the top neighboring pixel; and reconstruct the current block based on the obtained prediction value.

7. The apparatus of claim 6, wherein reconstructing the current block comprises:

obtaining residual information of the current block; and reconstructing the pixel in the current block based on the residual information and the prediction value of the pixel in the current block.

8. The apparatus of claim 6, wherein the left neighboring pixel is a left neighboring reference pixel adjacent to a left-bottom corner pixel of the current block.

9. The apparatus of claim 6, wherein the pixel in the current block is located at a bottom boundary of the current block.

10. The apparatus of claim 6, wherein the current block is one of a 16×16 block, a 8×8 block, or a 4×4 block.

11. A method for encoding a video signal, the method performed by an apparatus and comprising:

determining an intra prediction mode for a current block;

based on the determined intra prediction mode being an intra vertical prediction mode, obtaining a prediction value of a pixel in the current block based on a value of a top neighboring pixel adjacent to the current block and a difference between a value of a top-left neighboring pixel adjacent to the current block and a value of a left neighboring pixel adjacent to the current block, the pixel in the current block having a same x-coordinate as the top neighboring pixel; and reconstructing the current block based on the obtained prediction value.

12. A computer readable storage medium in which a bitstream generated by the method of claim 11 is stored.

13. An apparatus configured to encode a video signal, the apparatus comprising:

an encoder configured to:

determine an intra prediction mode for a current block;

based on the determined intra prediction mode being an intra vertical prediction mode, obtain a prediction value of a pixel in the current block based on a value of a top neighboring pixel adjacent to the current block and a difference between a value of a top-left neighboring pixel adjacent to the current block and a value of a left neighboring pixel adjacent to the current block, the pixel in the current block having a same x-coordinate as the top neighboring pixel; and reconstruct the current block based on the obtained prediction value.

* * * * *